United States Patent
Koga et al.

(10) Patent No.: US 11,980,259 B2
(45) Date of Patent: May 14, 2024

(54) BIODEGRADABLE HOOK-TYPE MOLDED SURFACE FASTENER WITH OUTSTANDING MOLDABILITY

(71) Applicants: KURARAY FASTENING CO., LTD., Osaka (JP); KURARAY CO., LTD., Kurashiki (JP)

(72) Inventors: Nobuhiro Koga, Kurashiki (JP); Satoru Ono, Sakai (JP); Junya Ide, Kurashiki (JP); Yoshikatsu Fujisawa, Sakai (JP)

(73) Assignees: Kuraray Fastening Co., Ltd., Osaka (JP); KURARAY CO., LTD., Okayama (JP)

( * ) Notice: Subject to any disclaimer, the term of this patent is extended or adjusted under 35 U.S.C. 154(b) by 290 days.

(21) Appl. No.: 17/441,327

(22) PCT Filed: Mar. 26, 2020

(86) PCT No.: PCT/JP2020/013591
§ 371 (c)(1),
(2) Date: Sep. 21, 2021

(87) PCT Pub. No.: WO2020/196722
PCT Pub. Date: Oct. 1, 2020

(65) Prior Publication Data
US 2022/0175093 A1    Jun. 9, 2022

(30) Foreign Application Priority Data
Mar. 28, 2019    (JP) .................................. 2019-062679

(51) Int. Cl.
A44B 18/00    (2006.01)
B29C 41/26    (2006.01)
(Continued)

(52) U.S. Cl.
CPC .......... *A44B 18/0049* (2013.01); *B29C 41/26* (2013.01); *C08L 67/02* (2013.01);
(Continued)

(58) Field of Classification Search
CPC . A44B 18/0049; A44B 18/0061; B29C 41/26; C08L 67/02; C08L 2201/06;
(Continued)

(56) References Cited

U.S. PATENT DOCUMENTS 5,441,687 A * 8/1995 Murasaki ................ B29C 48/35
264/173.1
5,766,277 A * 6/1998 DeVoe .................... B24D 11/00
51/297
(Continued)

FOREIGN PATENT DOCUMENTS

EP    0965615 B1    11/2002
EP    0877773 B1    1/2003
(Continued)

OTHER PUBLICATIONS

International Search Report dated Jun. 23, 2020 in PCT/JP2020/013591 (with English translation), 5 pages.
(Continued)

*Primary Examiner* — David M Upchurch
(74) *Attorney, Agent, or Firm* — Element IP, PLC

(57) ABSTRACT

A molded hook surface fastener having a base plate and hook engaging elements projecting from a surface of the base plate, both the base plate and the hook engaging elements being formed of a resin mixture containing polybutylene succinate (A), a modified starch having an amylose content of 45% by weight or more (B), and polyvinyl alcohol (C). The resin mixture is further characterized by having both a continuous phase and a dispersed phase, with the polybutylene succinate (A) present in the continuous (Continued)

phase, and the modified starch (B) and polyvinyl alcohol (C) present in the dispersed phase.

11 Claims, 1 Drawing Sheet

(51) Int. Cl.
*C08L 67/02* (2006.01)
*B29K 29/00* (2006.01)
*B29L 31/00* (2006.01)

(52) U.S. Cl.
CPC .... *B29K 2029/04* (2013.01); *B29K 2995/006* (2013.01); *B29L 2031/729* (2013.01); *C08L 2201/06* (2013.01); *C08L 2205/03* (2013.01)

(58) Field of Classification Search
CPC .............. C08L 2205/03; C08L 101/16; B29K 2029/04; B29K 2995/006; B29L 2031/729
See application file for complete search history.

(56) References Cited

U.S. PATENT DOCUMENTS

| | | | | |
|---|---|---|---|---|
| 5,830,548 A | * | 11/1998 | Andersen | C04B 28/04 428/152 |
| 5,860,194 A | * | 1/1999 | Takizawa | A44B 18/0049 24/442 |
| 5,985,406 A | * | 11/1999 | Takizawa | A44B 18/0061 24/444 |
| 2003/0044569 A1 | * | 3/2003 | Kacher | A47L 25/08 15/228 |
| 2003/0049407 A1 | * | 3/2003 | Kacher | A47L 13/18 15/228 |
| 2006/0089617 A1 | * | 4/2006 | Bunnelle | A61F 13/58 604/389 |
| 2008/0313795 A1 | * | 12/2008 | Lu | E03D 9/032 4/231 |
| 2020/0397631 A1 | * | 12/2020 | Weber | A61F 13/539 |

FOREIGN PATENT DOCUMENTS

| | | |
|---|---|---|
| JP | H02-298525 A | 12/1990 |
| JP | H06-38811 A | 2/1994 |
| JP | H11-124494 A | 5/1999 |
| JP | H11-181261 A | 7/1999 |
| JP | 2001192401 A | 7/2001 |
| JP | 2011026538 A | 2/2011 |
| JP | 2013049759 A | 3/2013 |
| JP | 2015048445 A | 3/2015 |

OTHER PUBLICATIONS

Extended European Search Report dated Nov. 14, 2022, in EP 20779978, 5 pages.

* cited by examiner

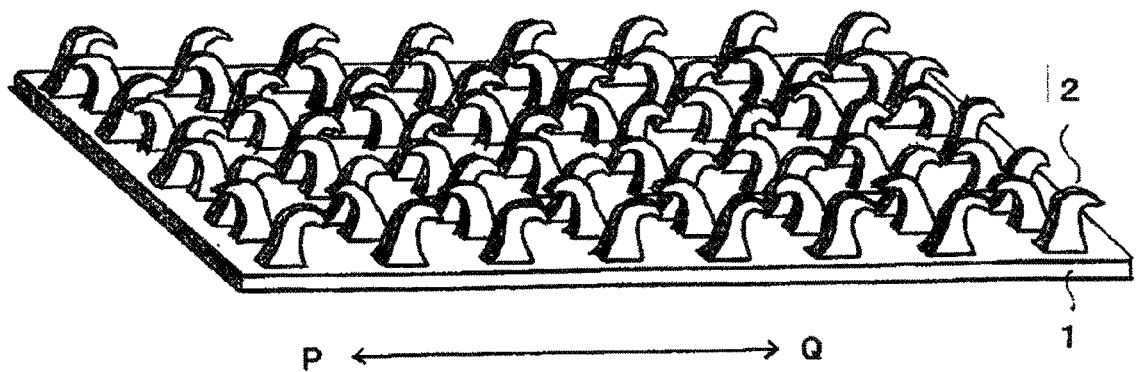

BIODEGRADABLE HOOK-TYPE MOLDED SURFACE FASTENER WITH OUTSTANDING MOLDABILITY

TECHNICAL FIELD

The present invention relates to a molded hook surface fastener in which a hook engaging element is hardly broken during its production to give a good appearance of the obtained molded surface fastener and a high engaging force during its use. Further, the molded hook surface fastener is naturally decomposed in an appropriate period after being discarded to hardly cause environmental destruction.

BACKGROUND ART

Conventionally, as one of means for attaching two objects to each other, a method has been used in which a surface fastener having a hook engaging element is fixed to a surface of one object, a surface fastener having a loop engaging element is fixed to a surface of the other object, and both engaging elements are engaged with each other by superposing engaging element surfaces of both surface fasteners to fix two objects. Further, as a binding band for binding rod-shaped objects or linear objects, a tape is widely known in which a surface fastener having a loop engaging element is attached to a front surface of one end of the tape and a surface fastener having a hook engaging element is attached to a rear surface of the other end of the tape.

In recent years, there has been a problem that plastic products discarded in nature are accumulated in nature without being decomposed and pollute the environment. Therefore, products made of biodegradable resins which do not pollute the natural environment have been demanded. With respect to surface fasteners, particularly surface fasteners used in the fields of agriculture, forestry, fishery, and civil engineering and construction and surface fasteners used in disposable goods, so-called biodegradable surface fasteners are required which are degraded in a relatively short period of time even when discarded into the natural environment after use.

Patent Literature 1 proposes a molded surface fastener made of a biodegradable resin mainly composed of polybutylene succinate or polyethylene adipate as a biodegradable surface fastener that meets such a demand.

Molded surface fasteners made of polybutylene succinate or polyethylene adipate are said to be biodegradable and thus capable of preventing environmental pollution. However, in practice, the decomposition rate in a natural environment is low. For example, when the molded surface fastener made of these resins is discarded in the soil, the molded surface fastener maintains its original shape even after one year. Therefore, it does not necessarily meet the requirement of rapid decomposition to prevent environmental pollution.

Patent Literature 1 describes that a molded surface fastener made of such a biodegradable resin has high strength.

As one method of producing a molded surface fastener having hook engaging elements on the surface thereof, there is known a method in which a molten resin is caused to flow on the surface of a die in the form of a sheet, the molten resin is pressed into a hook-shaped cavity formed on the surface of the die, and after cooling, the molded product is pulled out from the cavity and the sheet is peeled off from the surface of the die (also referred to as a "pultrusion molding method").

The present inventors have found that when the molded surface fastener described in Patent Literature 1 is produced by this method, the hook engaging element is broken when pulled out from the cavity.

The appearance of the molded surface fastener having the broken hook engaging element is poor, and the commercial value is greatly reduced.

On the other hand, as a method for increasing the mechanical strength of such a molded surface fastener made of a biodegradable resin, Patent Literature 2 proposes a molded surface fastener made of a resin material which is composed of polybutylene succinate and starch and in which starch is dispersed in the form of particles in polybutylene succinate.

The molded surface fastener made of a resin material described in Patent Literature 2 has a high decomposition rate in a natural environment, and the above-described problem of a low decomposition rate is solved. However, even in the molded surface fastener of Patent Literature 2, when produced by the pultrusion molding method, the hook engaging element is easily broken when pulled out from the cavity, and there is almost no improvement in strength. Rather, the strength may be lower than in the case of using a resin material consisting of polybutylene succinate alone.

CITATION LIST

Patent Literature

Patent Literature 1: JP 11-124494 A
Patent Literature 2: JP 11-181261 A

SUMMARY OF INVENTION

Technical Problem

It is an object of the present invention to provide a molded hook surface fastener wherein:
 the molded surface fastener is rapidly decomposed in a natural environment after being discarded, thereby causing no environmental disruption;
 a hook engaging element is hardly broken when being pulled out from a hook-shaped cavity during the production of the molded surface fastener by the pultrusion molding method;
 a base plate sheet hardly tears when being peeled off from a die surface, thereby providing a good appearance of the molded surface fastener; and
 the molded surface fastener exhibits high engaging force after engaged with a loop engaging element.

Solution to Problem

That is, the present invention provides the following (I) to (VIII).

(I) A molded hook surface fastener having a base plate and a large number of hook engaging elements projecting from a surface of the base plate, wherein both the base plate and the hook engaging elements is made of a resin mixture comprising polybutylene succinate (A) as a continuous phase and starch (B) as a dispersed phase, and satisfying the following requirements (1) to (3) simultaneously:
 (1) the dispersed phase comprises polyvinyl alcohol (C);
 (2) the starch (B) comprises a modified starch, and an amylose content of the starch (B) is 45% by weight or more; and (3) the hook engaging element tapers from a surface of the base plate toward a distal end portion and gradually bends from its middle such that the distal end portion faces a direction slightly approaching the surface of the base plate.

(II) The molded hook surface fastener according to (I), wherein a ratio of the polyvinyl alcohol (C) to a total weight of the starch (B) and the polyvinyl alcohol (C) is 2 to 75% by weight.

(III) The molded hook surface fastener according to (I) or (II), wherein a ratio of the polybutylene succinate (A) to a total weight of the polybutylene succinate (A), the starch (B), and the polyvinyl alcohol (C) is 45 to 90% by weight.

(IV) The molded hook surface fastener according to any one of (I) to (III), wherein the modified starch is etherified starch comprising a hydroxyalkyl group.

(V) The molded hook surface fastener according to any one of (I) to (IV), wherein the dispersed phase comprises clay.

(VI) The molded hook surface fastener according to any one of (I) to (V), wherein the dispersed phase comprises water in an amount of 3 to 30% by weight based on the starch (B).

(VII) The molded hook surface fastener according to any one of (I) to (VI), wherein the dispersed phase comprises a saturated fatty acid or a metal salt thereof.

(VIII) A method for producing a molded hook surface fastener, the method comprising:

covering a surface of a metal roll that has on its surface a large number of cavities with a molten resin mixture of the following (6) in a sheet form while pressing the molten resin mixture into the cavities, wherein each of the cavities is made into a shape corresponding to a hook engaging element satisfying the following (4) and (5);

solidifying the resin mixture in the cavities; and peeling the sheet of the resin mixture from the surface of the metal roll while pulling the solidified resin mixture out of the cavities;

(4) the cavity tapers from the surface of the metal roll to a distal end portion and bends gradually from its middle along a circumferential direction of the metal roll, and the distal end portion faces a direction slightly approaching the surface of the metal roll;

(5) on the surface of the metal roll, a plurality of cavities are arranged in a row in the circumferential direction of the metal roll, and a plurality of such rows are present in the width direction of the metal roll, wherein one row or a plurality of rows of cavities that extend in the circumferential direction and another different row or plurality of rows of cavities that bend in a direction opposite to a bending direction of the above cavities and extend in the circumferential direction are alternately arranged;

(6) the resin mixture comprises polybutylene succinate (A) as a continuous phase and starch (B) as a dispersed phase, wherein the dispersed phase is mixed with polyvinyl alcohol (C), the starch (B) comprises a modified starch, and an amylose content of the starch (B) is 45% by weight or more.

Advantageous Effects of Invention

In the present invention, a resin mixture comprising polybutylene succinate (A), starch (B), and polyvinyl alcohol (C) is used as a molding material. The polybutylene succinate (A) forms a continuous phase, and the starch (B) forms a dispersed phase, and the polyvinyl alcohol (C) is mixed in the dispersed phase. The starch (B) comprises a modified starch, and an amylose content of the starch (B) is 45% by weight or more. By using such a resin mixture as a molding material, the decomposition rate of the resin mixture is increased as compared with the case of polybutylene succinate alone, and after being discarded in nature, the resin mixture is rapidly biodegraded and returned to nature, so that environmental pollution and environmental destruction can be prevented.

Further, by using the resin mixture as a material of the molded hook surface fastener, it is possible to solve a problem that the hook engaging element is easily broken when the hook engaging element is pulled out from the cavity, and a problem that a base plate sheet easily tears when the base plate sheet of the surface fastener is peeled from the surface of the die.

These effects can be fully achieved only by combining the three requirements that the polyvinyl alcohol (C) is mixed with the starch (B), the starch (B) comprises a modified starch, and the amylose content of the starch (B) is 45% by weight or more.

BRIEF DESCRIPTION OF DRAWINGS

FIG. 1 is a perspective view schematically showing an example of a molded hook surface fastener of the present invention.

DESCRIPTION OF EMBODIMENTS

Hereinafter, the present invention will be described in detail with reference to the drawings.

FIG. 1 is a perspective view schematically showing an example of a molded hook surface fastener of the present invention. A large number of hook engaging elements 2 rise from the surface of a base plate 1. As shown in FIG. 1, a plurality of hook engaging elements with the same bending direction (the hook engaging elements in the front row shown in FIG. 1 are bent in the direction of Q shown in FIG. 1) are arranged in a row. Further, another row of hook engaging elements whose bending directions are the opposite (that is, in the direction of P shown in FIG. 1) is arranged by every other row or every plurality of rows (every other row in FIG. 1). The hook engaging element tapers from a root toward a distal end portion and gradually bends from its middle, and the distal end portion faces in a direction slightly approaching the surface of the base plate (hereinafter, this shape may be referred to as a "wave shape").

Such a wave-shaped molded hook surface fastener is obtained by covering a surface of a metal roll having a large number of wave-shaped cavities on the surface thereof with a molten resin in the form of a sheet while pressing the same molten resin into the cavities, peeling the sheet-shaped solidified resin from the surface of the metal roll after the resin is solidified while pulling out the wave-shaped hook engaging elements from the cavities.

As a method for producing a molded surface fastener including a step of pulling out a hook engaging element from a cavity in a die other than the above, there is a method for preparing a hook engaging element by solidifying a resin in a rod-shaped cavity extending straight in a vertical direction from a surface of a die, pulling out the rod-shaped solidified resin from the cavity, heating a top portion of the rod-shaped solidified resin, and pressing and bending the resin into a hook engaging element. In the case of this method, there is little possibility that the hook engaging element is broken at the time of pulling out, but a step of bending the distal end by heating after pulling out from the cavity is required. Further, the shape of the hook engaging element is irregular as compared with the hook engaging element obtained by the above-described production method, and the appearance is poor. In addition, since the hook engaging element swells in its middle, it is remarkably different from the hook engaging element obtained by the above-described production method (the hook engaging element of the present invention).

As described above, the resin mixture forming the molded hook surface fastener of the present invention comprises polybutylene succinate (A), starch (B) and polyvinyl alcohol (C) as essential components.

The polybutylene succinate (A) is an aliphatic polyester-based resin synthesized from 1,4-butanediol and succinic acid and is widely and commercially available as a biodegradable resin, which can be used in the present invention.

The polybutylene succinate (A) may contain a small amount of copolymerizable monomer components other than the above-described raw material monomer components as long as the effects of the present invention are not impaired, in addition to stabilizers, pigments, and dyes.

Typical examples of the biodegradable resin include, in addition to polybutylene succinate, polylactic acid, polyethylene adipate, and polycaprolactone. However, polybutylene succinate is used in the present invention in view of compatibility with starch and polyvinyl alcohol, moldability, and the like. Of course, a small amount of a biodegradable resin other than polybutylene succinate may be added as long as the effects of the present invention are not impaired.

The starch (B) may contain an unmodified starch and a modified starch, and preferably comprises 0 to 122 parts by weight, more preferably 0 to 100 parts by weight, still more preferably 0 to 82 parts by weight, and particularly preferably 0 parts by weight (that is, the total amount of the starch (B) is the modified starch) of the unmodified starch with respect to 100 parts by weight of the modified starch. Examples of the modified starch include at least one selected from the group consisting of an etherified starch, an esterified starch, a cationized starch, and a crosslinked starch. The modified starch can be obtained by modifying starch described later.

Examples of starch include starch obtained from cassava, corn, potato, sweet potato, tapioca, bean, lotus, wheat, rice, oat, and the like. Among them, corn starch and cassava starch are preferred, and corn starch having high amylose is more preferred. The starch may be used alone or in combination of two or more. These starches are modified to obtain modified starches. The majority of the above starches are amylopectin-based, with only a few amylose-based starches. In order to satisfy the requirement that "an amylose content of the starch (B) is 45% by weight or more" defined in the present invention, it is necessary to select a high amylose starch.

Examples of the etherified starch include an alkyletherified starch represented by a methyletherified starch; a carboxyalkyletherified starch represented by a carboxymethyletherified starch; a hydroxyalkyletherified starch represented by an etherified starch having a hydroxyalkyl group having 2 to 6 carbon atoms; and an allyletherified starch.

Examples of the esterified starch include an esterified starch having a structural unit derived from a carboxylic acid such as acetic acid; an esterified starch having a structural unit derived from a dicarboxylic acid anhydride such as maleic anhydride, phthalic anhydride, or octenylsuccinic anhydride; an esterified starch having a structural unit derived from an inorganic acid such as nitric acid or phosphoric acid; a urea phosphate-esterified starch; a xanthate-esterified starch; and an acetoacetate-esterified starch.

Examples of the cationized starch include a reaction product of starch and 2-diethylaminoethyl chloride and a reaction product of starch and 2,3-epoxypropyltrimethylammonium chloride.

Examples of the crosslinked starch include a formaldehyde-crosslinked starch, an epichlorohydrin-crosslinked starch, a phosphoric acid-crosslinked starch, and an acrolein-crosslinked starch.

In order to achieve the effects of the present invention, an etherified starch having a hydroxyalkyl group having 2 to 6 carbon atoms is preferred, and an etherified starch having a hydroxypropyl group modified by reacting propylene oxide is particularly preferred.

The amylose content (content of amylose-based starch) of the starch (B) is 45% by weight or more. When the amylose content is less than 45% by weight, the hook engaging element may be broken or the hook engaging element or the base plate may tear when being pulled out from the cavity of the die.

The amylose content is preferably 50% by weight or more, and more preferably 55% by weight or more.

As described above, the total amount of the starch (B) is preferably a modified starch. In this case, the content of amylose contained in the modified starch is the amylose content of the starch (B).

When the starch (B) comprises a modified starch and an unmodified starch, the ratio of the total weight of amylose in the modified starch and amylose in the unmodified starch with respect to the total weight of the modified starch and the unmodified starch is the amylose content of the starch (B).

Therefore, the starch (B) may be a mixture of a modified starch having a high amylose content and an unmodified starch having a low amylose content, or a mixture of a modified starch having a low amylose content and an unmodified starch having a high amylose content, in a ratio such that the amylose content of the starch (B) is 45% by weight or more. Even when an unmodified starch is contained, the amylose content of the starch (B) is 45% by weight or more, preferably 50% by weight or more, and more preferably 55% by weight or more.

It should be noted that the amylose content of natural starch usually does not exceed 90% by weight. Therefore, the amylose content of the starch (B) is usually 90% by weight or less.

The unmodified starch and the modified starch used in the present invention can be selected from commercially available products.

The polyvinyl alcohol (C) preferably has a saponification degree of 85 to 99.8% by mol. In particular, a completely saponified unmodified polyvinyl alcohol having a saponification degree of 99.0 to 99.8% by mol is preferred because the occurrence of breakage of the hook engaging element or tearing of the base plate sheet during the pultrusion molding can be highly prevented.

The polyvinyl alcohol (C) preferably has a viscosity of 3 mPa·s to 60 Pa·s at 20° C. when measured on a 4% aqueous solution of the polyvinyl alcohol (C) in accordance with JIS Z 8803.

The base plate and the hook engaging element of the molded hook surface fastener of the present invention are formed of a resin mixture comprising the polybutylene succinate (A), the starch (B), and the polyvinyl alcohol (C), wherein the polybutylene succinate (A) forms a continuous phase, the starch (B) forms a dispersed phase, and the polyvinyl alcohol (C) is mixed with the dispersed phase (starch (B)).

By the continuous phase formed by the polybutylene succinate (A) and dispersed phase formed by the starch (B), the occurrence of breakage of the hook engaging element or tearing of the base plate sheet during the pultrusion molding can be highly prevented. In order to form the continuous phase of the polybutylene succinate (A) and the dispersed phase of the starch (B), the ratio of the polybutylene succinate (A) to the total weight of the polybutylene succinate (A), the starch (B), and the polyvinyl alcohol (C) is preferably 45% by weight or more, more preferably 50% by weight or more, and still more preferably 55% by weight or more.

When the ratio of the polybutylene succinate (A) is too high and the ratio of the starch (B) is too low, the biodegradation rate becomes slow to take a long time until the molded hook surface fastener is decomposed into natural by-products after being discarded in nature. Therefore, the ratio of the polybutylene succinate (A) to the total weight of the polybutylene succinate (A), the starch (B), and the polyvinyl alcohol (C) is preferably 92% by weight or less, more preferably 90% by weight or less, and still more preferably 85% by weight or less.

That is, the ratio of the polybutylene succinate (A) to the total weight of the polybutylene succinate (A), the starch (B), and the polyvinyl alcohol (C) is preferably 45, 50 or 55% by weight or more and 85, 90 or 92% by weight or less, and particularly preferably 55 to 85% by weight.

The weight of the polyvinyl alcohol (C) to the total weight of the starch (B) and the polyvinyl alcohol (C) is preferably 2 to 75% by weight. When the weight of the polyvinyl alcohol (C) is less than 2% by weight, it is difficult to prevent the hook engaging element from being broken during the pultrusion molding, and when the weight of the polyvinyl alcohol (C) exceeds 75% by weight, the decomposition rate becomes slow to take a long time until the molded hook surface fastener is decomposed into natural by-products after being discarded in nature. More preferably, the weight of the polyvinyl alcohol (C) is 5 to 70% by weight.

In order to prevent the occurrence of breakage of the hook engaging element or tearing of the base plate sheet during the pultrusion molding, clay is preferably mixed into the dispersed phase. Examples of the clay include synthetic or natural layered silicate clays, such as montmorillonite, bentonite, beidellite, mica, hectorite, saponite, nontronite, sauconite, vermiculite, ledikite, magadite, kenyaite, stevensite, and volkonskoite. Modified products of these clays may be used. The amount of the clay added to the dispersed phase is preferably 0.1 to 5% by weight and more preferably 0.5 to 2% by weight based on the starch (B).

In order to prevent the occurrence of breakage of the hook engaging element or tearing of the base plate sheet during the pultrusion molding, a saturated fatty acid or a metal salt thereof is preferably added to the dispersed phase. By adding the saturated fatty acid or the metal salt thereof, the slip between starch molecules is improved, and as a result, it is possible to prevent the hook engaging element from being broken or the base sheet from tearing during the pultrusion molding.

Examples of the saturated fatty acid or the metal salt thereof include fatty acids having 12 to 22 carbon atoms and metal salts thereof, such as stearic acid, palmitic acid, lauric acid, myristic acid, linoleic acid, behenic acid, and sodium salts, calcium salts, and potassium salts of these acids. The amount of the saturated fatty acid or the metal salt thereof is 0.01 to 5% by weight based on the component (B).

It is preferable that the dispersed phase comprises water in an amount of 3 to 30% by weight based on the starch (B) in order to prevent the occurrence of breakage of the hook engaging element during the pultrusion molding. The content of water is more preferably 5 to 20% by weight.

As a method of mixing the polybutylene succinate (A), the starch (B), the polyvinyl alcohol (C), and the optional components (clay, saturated fatty acid, and metal salt thereof), there are a method of mixing them simultaneously at the time of molding a surface fastener, and a method of blending all components simultaneously and pelletizing them prior to molding a surface fastener.

However, a method in which the starch (B) (hereinafter, sometimes referred to as "component (B)"), the polyvinyl alcohol (C) (hereinafter, sometimes referred to as "component (C)") and an optional component are melt mixed to form pellets in advance, and the obtained pellets and pellets of the polybutylene succinate (A) (hereinafter, sometimes referred to as "component (A)") are mixed and melted to be used for molding a surface fastener is preferred because a surface fastener having high physical properties such as strength can be obtained.

In this case, the pellets of the component (B), the component (C), and the optional component and the pellets of the component (A) may be melt mixed and pelletized, and the obtained pellets may be used for molding a surface fastener, or the pellets of the component (B), the component (C), and the optional component and the pellets of the component (A) may be melt mixed and used for molding a surface fastener without pelletizing.

As the method of melt mixing the component (B), the component (C), and the optional component to form pellets in advance, a method of sequentially carrying out a step (a) of mixing the component (B), the component (C), and the optional component while heating and melting, a step (b) of extruding the molten mixture from a die, and a step (c) of cooling and drying the extruded molten mixture is suitably used.

Step (a) is usually carried out using an extruder. In the extruder, the component (B), the component (C), and the optional component are homogeneously mixed while applying shear stress to each component by a screw and heating by the heat of an externally heated barrel. As the extruder, a single-screw extruder or a twin-screw extruder can be used. The twin-screw extruder can be either co-rotating or counter-rotating. The screw diameter is preferably 20 to 150 mm, and the ratio L/D of the extruder length (L) to the screw diameter (D) is preferably 20 to 50. The rotational speed of the screw is preferably 80 rpm or more, and more preferably 100 rpm or more. The extrusion pressure is preferably 5 bar (0.5 MPa) or more, and more preferably 10 bar (1.0 MPa) or more. The component (B), the component (C), and the optional component may be fed separately and directly into the extruder, or they may be premixed by means of a mixer and then fed into the extruder.

The step (a) is preferably carried out at 120 to 180° C., and more preferably at 160 to 180° C. When the temperature is 120° C. or higher, the component (C) can be prevented from becoming coarse particles, and particles having an appropriate particle diameter can be dispersed. By this step, the starch particles in the component (B) are crushed and gelled. Physical properties such as strength of the molded surface fastener are improved by crushing and gelling the starch particles.

In the step (a), water may be introduced into the extruder at a relatively early stage. For example, water may be introduced at 100° C. or lower before reaching the heating temperature, or water may be introduced after reaching the heating temperature (120 to 180° C.). The component (B) is gelatinized (gelation) by a combination of water, heat and shear stress. Further, by introducing water, the component (C) is dissolved therein, and the resin mixture of the component (B) and the component (C) is softened to reduce the modulus and brittleness. As a result, physical properties such as strength of the molded surface fastener is enhanced.

In order to prevent foaming, the mixture of the component (B), the component (C), and the optional component heated and melted in the step (a) is preferably fed toward the die while cooling to preferably 85 to 120° C. and more preferably 100 to 120° C. The barrel may be vented to prevent foaming and to remove water. The residence time in the extruder is set according to the temperature profile and the screw speed but is preferably 1 to 2.5 min.

In the step (b) of extruding the molten mixture, the molten mixture moved by a screw in the extruder is extruded from the die. The temperature of the die is preferably 85 to 120° C., and more preferably 90 to 110° C. The water content in the mixture extruded in the step (b) is preferably 10 to 50% by weight, more preferably 20 to 40% by weight, still more preferably 22 to 40% by weight, and most preferably 25 to 35% by weight. The molten mixture is preferably extruded through a multi-hole strand nozzle.

In the step (c) of cooling and drying the molten mixture extruded from the nozzle, the strand extruded from the strand nozzle is cooled to 80 to 100° C. and cut into pellets with a rotary cutter. In this case, in order to prevent sticking of the pellets, it is preferable that the pellets are periodically or steadily vibrated and water in the pellets is removed by hot air, dehumidified air, an infrared heater or the like.

The thus obtained pellets of the resin mixture of the component (B), the component (C), and the optional component are blended with the pellets of the component (A), melted, pelletized or not pelletized, and used for molding a molded surface fastener. Water may be added when the pellets composed of the component (B), the component (C), and the optional component and the pellets of the component (A) are melted.

Next, a method for producing a molded surface fastener having a wave-shaped hook engaging element using the resin mixture will be described.

As an example, a method of producing a sheet having a large number of hook engaging elements on its surface by
  using a metal roll having a large number of cavities for hook engaging element on its surface,
  flowing a melt of the resin mixture on the surface of the metal roll in the form of a sheet, and simultaneously pressing the melt of the resin mixture into the cavities,
  peeling the sheet from the surface of the metal roll after the melt is solidified, and simultaneously pulling out the hook engaging elements from the cavities
will be described.

A die roll is produced by sequentially superposing the following rings in this order:
  a ring-shaped die (a) having a thickness of 0.2 to 0.5 mm in which a plurality of cavities having the shape of a hook engaging element are engraved along the circumferential direction;
  a metal ring (b) in which no cavity is engraved;
  a ring-shaped die (c) having a thickness of 0.2 to 0.5 mm in which a plurality of cavities having the shape of a hook engaging element that bends to the direction opposite to the direction of the ring-shaped die (a) are engraved along the circumferential direction; and
  a metal ring (b) in which no cavity is engraved, in this order.

On the outer surface of the die roll obtained in this manner, a row in which hook engaging element-shaped cavities are arranged in the circumferential direction and another row in which hook engaging element-shaped cavities that bend to the direction opposite to the above cavities are arranged in the circumferential direction are alternately arranged in the width direction (length direction).

Two rows of hook engaging element-shaped cavities extending in the circumferential direction and other two rows of hook engaging element-shaped cavities that bend to the direction opposite to above cavities and extend in the circumferential direction may be alternately arranged by superposing the rings in the order of the ring-shaped die (a), the metal ring (b), the ring-shaped die (a), the metal ring (b), the ring-shaped die (c), the metal ring (b), the ring-shaped die (c), the metal ring (b).

The cavity tapers from the surface of the metal roll to a distal end portion and bends gradually from its middle along the circumferential direction of the metal roll, and the distal end portion faces in a direction slightly approaching the surface of the metal roll. Since the cavity bends in this manner, the engaging element is usually easily cut when the solidified hook engaging element is pulled out from the cavity. However, in the present invention, since the above-described resin mixture is used, it is possible to prevent the hook engaging element from being cut.

A molded hook surface fastener is obtained by flow-molding a molten resin mixture on the surface of a metal roll.

In the flow molding,
  a melt of the resin mixture is extruded into a gap between a metal roll and another drum roll arranged at a position opposite to the metal roll
  the melt is pressed into the cavity while forming a sheet of the melt having a uniform thickness on the surface of the roll,
  the melt in the cavity is cooled and solidified by a refrigerant constantly circulating in the roll under rotating the die roll while stretching the sheet of the melt by using a nip roller with an adjusted gap so that a base plate of the resulting molded hook surface fastener has a uniform thickness, and
  the cooled and solidified sheet is peeled off from the surface of the die roll while forcibly pulling out the hook engaging element from the cavity.

Thus, a molded surface fastener having a large number of hook engaging elements on its surface is obtained.

The obtained molded surface fastener comprises the polybutylene succinate (A), the starch (B), the polyvinyl alcohol (C), and the optional components (clay, saturated fatty acid, and metal salt thereof). The ratio of the polybutylene succinate (A) to the total weight of the polybutylene succinate (A), the starch (B), and the polyvinyl alcohol (C), the ratio of the polyvinyl alcohol (C) to the total weight of the starch (B) and the polyvinyl alcohol (C), the ratio of the clay to the starch (B), and the ratio of the saturated fatty acid or metal salt thereof to the starch (B) are as described above with respect to the resin mixture.

In the molded surface fastener thus obtained,
  (1) the hook engaging element tapers from the root to the distal end portion and gradually bends from its middle to make the distal end portion face a direction slightly approaching the surface of the base plate, (2) a plurality of hook engaging elements bending to the same direction are arranged in a row in the bending direction, and (3) one or more rows of hook engaging elements and another different one or more rows of hook engaging elements that bend to the direction opposite to the cavities in the above one or more rows are alternately arranged.

Note that the distal end portion of the hook engaging element facing a direction slightly approaching the base plate means that the height of the distal end portion of the hook engaging element (height from the surface of the base plate) is 85 to 98% of the height of the top portion of the inner surface of the bending portion (height from the surface of the base plate). This value is an average of ten hook engaging elements arbitrarily selected.

In the present invention, the height of the hook engaging element is preferably 1.0 to 2.0 mm, and it is preferable that the hook engaging element starts to gradually bend from the vicinity of ½ to ¾ of the engaging element height from the root.

When viewed from a direction perpendicular to the bending direction, the thickness of the hook engaging element gradually tapers from the root to the distal end portion of the hook engaging element. When the above-described ring-shaped die is used, since the width of the hook engaging element is inevitably limited by the thickness of the ring-shaped die, the width of the hook engaging element is substantially constant from the root to the distal end portion.

It is important that the individual hook engaging elements constituting the molded hook surface fastener of the present invention are not divided into a plurality of pieces (not branched) from the root to the distal end portion and do not become thick form the root portion The base plate serving as the base from which the hook engaging element rises preferably has a thickness of 0.1 to 0.3 mm in terms of flexibility and strength. The density of the hook engaging elements present on the base plate is preferably 60 to 160 elements/cm$^2$, and more preferably 80 to 140 elements/cm$^2$.

The molded hook surface fastener of the present invention can be engaged with each other, but is usually used in combination with a surface fastener having loop engaging elements. Therefore, it is preferable that the surface fastener having the loop engaging elements used in combination also has biodegradability. Since the surface fastener having the loop engaging elements is usually made of fine fibers, it is possible to obtain a biodegradation rate equivalent to that of the molded hook surface fastener of the present invention by using fibers made of an ordinary biodegradable resin.

Therefore, it is not always necessary to add starch or polyvinyl alcohol, as in the present invention, to the biodegradable resin for the surface fastener having the loop engaging elements to accelerate the biodegradation rate.

In particular, it is sufficient that the surface fastener having the loop engaging elements is produced from fibers made of 100% of fiber-forming biodegradable resins such as polybutylene adipate and polylactic acid. A representative example is a surface fastener produced by producing a woven or knitted fabric using a multifilament yarn made of the biodegradable resin, weaving or knitting the multifilament yarn made of the biodegradable resin into the woven or knitted fabric while floating the multifilament yarn in a loop shape on the surface of the woven or knitted fabric. Fibers made of the biodegradable resins may be formed into a nonwoven fabric while floating the fibers in a loop shape on the surface.

Usually, in the case of a surface fastener having a loop engaging element, in order to prevent the loop engaging element from being pulled out from the surface of a woven or knitted fabric or a nonwoven fabric by the pulling force during the disengagement, an adhesive is applied to the back surface of the woven or knitted fabric or the nonwoven fabric, or heat-fusible fibers are used as a part of the fibers constituting the woven or knitted fabric or the nonwoven fabric to fix the loop engaging element to the woven or knitted fabric or the nonwoven fabric by fusing the heat-fusible fibers. A biodegradable resin is preferably used for the adhesive and the heat-fusible fiber.

As described above, although the molded hook surface fastener of the present invention has a sufficiently high engaging force, the molded hook surface fastener does not cause environmental destruction due to rapid decomposition in a natural environment when discarded. Therefore, it is suitable as a surface fastener which is used in an application field where a high engaging force is required and which is discarded in a natural environment after use, for example, a field of agriculture, forestry and fishery, civil engineering and construction, or a field of disposable goods. Specifically, the molded hook surface fastener of the present invention is used for binding tapes for fruit bags, binding strings for harvested crops, temporary fixing tapes used in agriculture and forestry, binding strings used in the civil engineering field and the building field, surface fasteners for fixing seedling covers, surface fasteners for fixing seedlings, fixing tapes for diapers, and the like.

EXAMPLES

Hereinafter, the present invention will be described in detail with reference to Examples and Comparative Examples.

In Examples and Comparative Examples:

The engaging force was measured for both shear and peel in accordance with the method of JIS L3416. As the surface fastener having a loop engaging element for engaging with a molded hook surface fastener, a woven surface fastener (MAGICTAPE (registered trademark) B2790Y.11, manufactured by Kuraray Fastening Co., Ltd.) was used.

The biodegradability was determined by burying a molded hook surface fastener in soil at 40° C., and measuring the period required until the hook engaging element and the base plate lost their strength and was easily reduced to pieces, thereby the hook engaging element and the base plate losing their shape.

Examples 1 to 3 and Comparative Examples 1 to 5

Raw Material of Molding Resin
Component (A):
 Polybutylene succinate: Bio-PBS manufactured by Mitsubishi Chemical Corporation.
Component (B):
 Starch: hydroxypropyl ether-modified corn starch having an amylose content of 80% by weight and
  hydroxypropyl ether-modified cassava starch having an amylose content of 20% by weight.
Component (C):
 Polyvinyl alcohol: completely saponified polyvinyl alcohol having a saponification degree of 99.3%.
 Clay: natural montmorillonite
 Saturated fatty acid: stearic acid Preparation of Molding Die A ring-shaped die having a thickness of 0.30 mm and a diameter of 212 mm in which cavities each having the shape of hook engaging element were engraved on the outer circumference;

a metal ring having a thickness of 0.30 mm and a diameter of 212 mm with a flat outer circumferential surface having no cavity;

a ring-shaped die having a thickness of 0.30 mm and a diameter of 212 mm in which cavities each having the shape of a hook engaging element that bent in the direction opposite to the above hook engaging element were engraved on the outer circumference; and a metal ring having a thickness of 0.30 mm and a diameter of 212 mm with a flat outer circumferential surface having no cavity were sequentially superposed in this order to prepare a die roll having a width of 120 mm.

On the outer surface of the die roll, a row in which hook engaging element-shaped cavities are arranged in the circumferential direction and another row in which hook engaging element-shaped cavities that bent in the direction opposite to the above hook engaging element are arranged in the circumferential direction were alternately arranged in the width direction.

Production of Molded Hook Surface Fastener

The component (B), the component (C), the clay, and the saturated fatty acid were pelletized using the method of sequentially performing the step (a), the step (b), and the step (c). The conditions for each step were selected from the ranges described above.

The resulting pellets were blended with pellets of the component (A), melted, and pelletized to obtain each composition. During the pelletization, water was added. The ratios of the components of each composition obtained are shown in Table 1.

Each of the obtained compositions was melted at 105° C., and the melt was extruded into a gap between the die roll and another drum roll arranged at a position opposite to the die roll. By pressing, each cavity was filled with the melt and a sheet having a uniform thickness was formed on the surface of the roll. While the die roll was rotating, the melt in the cavity was cooled by water constantly circulated in the roll. The cooled and solidified sheet was peeled off from the surface of the die roll while being stretched by a nip roll whose gap was adjusted so that the base plate thickness was 0.20 mm, thereby producing a molded hook surface fastener.

In the molded hook surface fasteners of Examples 1 to 3 and Comparative Examples 4 and 5, the component (A) formed a continuous phase, and the component (B) formed a dispersed phase. In the molded hook surface fastener of Comparative Example 1, the component (A) formed a dispersed phase and the component (B) formed a continuous phase.

TABLE 1

|  | Component (A) Polybutylene succinate (% by weight) | Component (B) Amylose content 80% by weight (% by weight) | Component (B) Amylose content 20% by weight (% by weight) | Component (C) Polyvinyl alcohol (% by weight) | Water (% by weight) |
|---|---|---|---|---|---|
| Example 1 | 50.0 | 43.0 | 0 | 1.0 | 6.0 |
| Example 2 | 70.0 | 25.8 | 0 | 0.6 | 3.6 |
| Example 3 | 90.0 | 8.6 | 0 | 0.2 | 1.2 |
| Comparative Example 1 | 30.0 | 60.2 | 0 | 1.4 | 8.4 |
| Comparative Example 2 | 0 | 86.0 | 0 | 2.0 | 12.0 |
| Comparative Example 3 | 100 | 0 | 0 | 0 | 0 |
| Comparative Example 4 | 50.0 | 0 | 43.0 | 1.0 | 6.0 |
| Comparative Example 5 | 70.0 | 0 | 25.8 | 0.6 | 3.6 |

Content of Clay (Examples 1 to 3 and Comparative Examples 1 to 5):

2.2% by weight of component (B)

Content of Stearic Acid (Examples 1 to 3 and Comparative Examples 1 to 5):

0.2% by weight of component (B)

Shape of the Obtained Molded Hook Surface Fastener

The molded hook surface fasteners obtained in Examples 1 to 3 had a shape as shown in FIG. 1. That is, each of the hook engaging elements tapered from the surface of the base plate toward the distal end portion and began to gradually bend from the root in the vicinity of ⅔ of the height of the engaging element, and the distal end portion had a wave shape and faced a direction slightly approaching the surface of the base plate. The height of the hook engaging element was 1.25 mm from the surface of the base plate. The height of the distal end portion of the hook engaging element was 95% of the height of the top portion of the inner surface of the bending portion. That is, the distal end portion was closer to the base plate by 5% in the height direction with respect to the top portion of the inner surface of the bending portion.

In each of the molded hook surface fasteners of Examples 1 to 3, the density of the hook engaging elements was 110 elements/cm$^2$, the thickness of the base plates was 0.20 mm, the interval between adjacent hook engaging elements in the same row was 1.47 mm, and the interval between adjacent rows of hook engaging element was 0.60 mm.

The moldability at the time of molding the obtained molded hook surface fastener (whether the hook engaging element was pulled out from the cavity without breaking, whether there was a tear in the hook surface fastener even if the hook engaging element was pulled out, or the like), the engaging force and the biodegradability of the obtained molded hook surface fastener were measured. The results obtained are shown in Table 2 below.

TABLE 2

|  | Moldability | Engaging force (Shear: N/cm²) | Engaging force (Peel: N/cm) | Biodegradability (weeks required for decomposition) |
|---|---|---|---|---|
| Example 1 | A | 15.3 | 1.17 | 28 |
| Example 2 | A | 16.1 | 1.23 | 32 |
| Example 3 | A | 16.6 | 1.30 | 38 |
| Comparative Example 1 | C | 14.2 | 1.08 | 12 |
| Comparative Example 2 | D | — | — | — |
| Comparative Example 3 | B or C | 17.2 | 1.42 | 62 |
| Comparative Example 4 | D | — | — | — |
| Comparative Example 5 | C | 4.5 | 0.62 | — |

A: The molded hook surface fastener was molded without any problem in the moldability of the hook engaging elements and the pull-out property of the surface fastener.
B: Slight breaking of the hook engaging elements was observed.
C: The hook engaging elements were often broken, and it was difficult to peel the surface fastener from the surface of the die to cause tearing in places on the base plate of the surface fastener.
D: The hook engaging element was not pulled out, and the surface fastener wound around the die, so that the surface fastener could not be produced.

There was no problem in the moldability of the molded hook surface fasteners obtained in Examples 1 to 3, the hook engaging element was not broken, and the surface fastener did not tear at all when peeled off from the surface of the die. The engaging force was also excellent, and the time required for biodegradation was within one year, which was a suitable range.

On the other hand, in Comparative Example 1 in which the mixing ratio of polybutylene succinate was small, a molded hook surface fastener was obtained, but the engaging force was low and it was not suitable for use in a product to which force is applied. Further, the biodegradation rate was too high, and it was not suitable for general-purpose use.

In Comparative Example 2 in which polybutylene succinate was not mixed, it was not possible to obtain a molded hook surface fastener.

In Comparative Example 3 in which a modified starch and polyvinyl alcohol were not added, the engaging force of the obtained molded hook surface fastener was high, but the moldability was poor, and the time required for decomposition was too long, and it was expected that the molded hook surface fastener would remain in its original shape for a long time in the natural environment even if discarded, resulting in environmental destruction.

In Comparative Examples 4 and 5 in which a modified starch having a low amylose content was used, although polybutylene succinate and polyvinyl alcohol were added in the same amounts as in Examples 1 and 2, a molded hook surface fastener was not obtained (Comparative Example 4), or even if a molded hook surface fastener was obtained somehow (Comparative Example 5), the obtained molded hook surface fastener had a too low engaging force to be used as a surface fastener and had no commercial value.

Examples 4 to 6 and Comparative Examples 6 and 7

The hydroxypropyl ether-modified corn starch having an amylose content of 80% by weight and the hydroxypropyl ether-modified cassava starch having an amylose content of 20% by weight were mixed in equal amounts to prepare a modified starch having an amylose content of 50% by weight. Using this modified starch, each molded hook surface fastener having a composition shown in Table 3 below was produced in the same manner as in Examples 1 to 3. In Comparative Example 7 in which polyvinyl alcohol was not blended, a method of blending all components during the molding was employed.

The shape of the molded hook surface fastener was the same as those of Examples 1 to 3 except that the height of the hook engaging elements is 1.2 times that of Examples 1 to 3 and the bending direction of the hook engaging elements was reversed every two rows.

TABLE 3

|  | Component (A) Polybutylene succinate (% by weight) | Component (B) Amylose content 50% by weight (% by weight) | Component (C) Polyvinyl alcohol (% by weight) | Water (% by weight) |
|---|---|---|---|---|
| Example 4 | 50.0 | 19.0 | 25.0 | 6.0 |
| Example 5 | 70.0 | 11.4 | 15.0 | 3.6 |
| Example 6 | 90.0 | 3.8 | 5.0 | 1.2 |
| Comparative Example 6 | 30.0 | 26.6 | 35.0 | 8.4 |
| Comparative Example 7 | 50.0 | 38.0 | 0 | 12.0 |

Content of Clay (Examples 4 to 6 and Comparative Examples 6 and 7):
  2.2% by weight of component (B)
Content of Stearic Acid (Examples 4 to 6 and Comparative Examples 6 and 7):
  0.2% by weight of component (B)

The moldability, the engaging force, and the biodegradability of the obtained molded hook surface fastener were measured in the same manner as in Examples 1 to 3. The results are shown in Table 4 below. In the molded hook surface fasteners of Examples 4 to 6 and Comparative Example 7, polybutylene succinate formed a continuous phase and modified starch formed a dispersed phase, and in Comparative Example 6, it was the opposite.

TABLE 4

|  | Moldability | Engaging force (Shear: N/cm$^2$) | Engaging force (Peel: N/cm) | Biodegradability (weeks required for decomposition) |
| --- | --- | --- | --- | --- |
| Example 4 | A | 12.8 | 1.00 | 20 |
| Example 5 | A | 14.2 | 1.02 | 28 |
| Example 6 | A | 16.3 | 1.08 | 32 |
| Comparative Example 6 | B | 11.1 | 0.92 | 10 |
| Comparative Example 7 | C or D | — | — | — |

Evaluation Ratings A to D are as Described in Table 2.

The molded hook surface fasteners of Examples 4 to 6 had no problem in the moldability, were excellent in the engaging force, and the time required for biodegradation was a suitable time of one year or less. On the other hand, in the case of Comparative Example 6 in which the mixing ratio of polybutylene succinate was small, there were problems in terms of the moldability and the engaging force, and the decomposition rate was too high, so that it was not suitable for general-purpose use. Further, in the case of Comparative Example 7 in which polyvinyl alcohol was not added, the moldability was poor, and a molded hook surface fastener measurable for the engaging force was not obtained.

Comparative Example 8

A molded hook surface fastener was produced in the same manner as in Example 1 except that an unmodified starch having an amylose content of 80% by weight was used instead of the modified starch. However, the moldability was poor, and breakage of the hook engaging element and tearing of the base plate occurred during the pultrusion molding. The molded hook surface fastener that was obtained after much effort had broken hook engaging elements in many places and had no commercial value.

Comparative Examples 9 and 10

In Comparative Example 9, a molded hook surface fastener was produced in the same manner as in Examples 1 to 3 except that a mixed modified starch obtained by mixing a hydroxypropyl ether-modified corn starch having an amylose content of 80% by weight and a hydroxypropyl ether-modified cassava starch having an amylose content of 20% by weight was used so that the amylose content was 35% by weight.

In Comparative Example 10, a molded hook surface fastener was produced in the same manner as in Examples 1 to 3 except that a modified starch was not used and a method of blending all components during the molding of a surface fastener was employed.

In the molded hook surface fastener of Comparative Example 9, polybutylene succinate formed a continuous phase and modified starch formed a dispersed phase. In Comparative Example 10, polyvinyl alcohol formed a dispersed phase.

TABLE 5

|  | Component (A) Polybutylene succinate (% by weight) | Component (B) Amylose content 35% by weight (% by weight) | Component (C) Polyvinyl alcohol (% by weight) | Water (% by weight) |
| --- | --- | --- | --- | --- |
| Comparative Example 9 | 70.0 | 25.8 | 0.6 | 3.6 |
| Comparative Example 10 | 70.0 | 0 | 18.4 | 11.6 |

Content of Clay (Comparative Examples 9 and 10): 2.2% by weight of component (B)

Content of Stearic Acid (Comparative Examples 9 and 10): 0.2% by weight of component (B)

The moldability, the engaging force, and the biodegradability of the molded hook surface fasteners obtained in Comparative Examples 9 and 10 were measured in the same manner as in Examples 1 to 3. The results are shown in Table 6 below.

TABLE 6

|  | Moldability | Engaging force (Shear: N/cm$^2$) | Engaging force (Peel: N/cm) | Biodegradability (weeks required for decomposition) |
| --- | --- | --- | --- | --- |
| Comparative Example 9 | C | 7.8 | 0.73 | 32 |
| Comparative Example 10 | C | 15.7 | 1.18 | 76 |

Evaluation rating C was as described in Table 2.

In the molded hook surface fastener of Comparative Example 9, broken hook engaging elements were present in places, the commercial value was low, and the engaging force was not satisfactory. The molded hook surface fastener of Comparative Example 10 also had broken hook engaging elements in places, and had a low commercial value. In addition, the biodegradation rate was low and did not match the needs of society.

REFERENCE SIGNS LIST

1: Base plate
2: Hook engaging element
PQ: Bending direction of hook engaging element

The invention claimed is:

1. A molded hook surface fastener having a base plate and hook engaging elements projecting from a surface of the base plate,
wherein both the base plate and the hook engaging elements comprise a resin mixture comprising polybutylene succinate, a modified starch having an amylose content of 45% by weight or more (B), and polyvinyl alcohol (C);
and wherein
the hook engaging elements each taper from the surface of the base plate toward a distal end portion thereof and bend from a middle portion thereof such that the distal end portion of the hook engaging elements face a direction approaching the surface of the base plate, and
the resin mixture further comprises a continuous phase and a dispersed phase, said polybutylene succinate (A) being present in the continuous phase, and said modified starch having an amylose content of 45% by weight or more (B) and said polyvinyl alcohol (C) being present in the dispersed phase.

2. The molded hook surface fastener according to claim 1, wherein a ratio of the polyvinyl alcohol (C) to a total weight of the starch (B) and the polyvinyl alcohol (C) in the resin mixture is 2 to 75% by weight.

3. The molded hook surface fastener according to claim 1, wherein a ratio of the polybutylene succinate (A) to a total weight of the polybutylene succinate (A), the starch (B), and the polyvinyl alcohol (C) in the resin mixture is 45 to 90% by weight.

4. The molded hook surface fastener according to claim 1, wherein the modified starch is etherified starch comprising a hydroxyalkyl group.

5. The molded hook surface fastener according to claim 1, wherein the dispersed phase further comprises clay.

6. The molded hook surface fastener according claim 1, wherein the dispersed phase further comprises water in an amount of 3 to 30% by weight based on the starch (B).

7. The molded hook surface fastener according to claim 1, wherein the dispersed phase further comprises a saturated fatty acid or a metal salt thereof.

8. A method for producing a molded hook surface fastener, the method comprising:
covering a surface of a metal roll that has on its surface plural cavities with a molten resin mixture in a sheet form while pressing the molten resin mixture into the plural cavities, wherein each of the plural cavities has a shape corresponding to a hook engaging element;
solidifying the resin mixture in the plural cavities; and
peeling the sheet of the resin mixture from the surface of the metal roll while pulling the solidified resin mixture out of the plural cavities;
wherein:
the plural cavities taper from the surface of the metal roll to a distal end portion of the plural cavities and bend from a middle portion thereof along a circumferential direction of the metal roll, and the distal end portion of the plural cavities faces a direction approaching the surface of the metal roll;
on the surface of the metal roll, the plurality of cavities are arranged in a row in the circumferential direction of the metal roll, and a plurality of such rows are present in the width direction of the metal roll, wherein one row or a plurality of rows of cavities that extend in the circumferential direction and another different row or plurality of rows of cavities that bend in a direction opposite to a bending direction of the above cavities and extend in the circumferential direction are alternately arranged; and
the resin mixture comprises a continuous phase and a dispersed phase, polybutylene succinate (A) is present in the continuous phase, and modified starch having an amylose content of 45% by weight or more (B) and polyvinyl alcohol (C) are present in the dispersed phase.

9. The molded hook surface fastener according to claim 1, wherein said modified starch having an amylose content of 45% by weight or more (B) is the only starch present in said resin mixture.

10. The molded hook surface fastener according to claim 1, wherein:
a ratio of the polybutylene succinate (A) to a total weight of the polybutylene succinate (A), the starch (B), and the polyvinyl alcohol (C) in the resin mixture is 55 to 85% by weight;
a ratio of the polyvinyl alcohol (C) to a total weight of the starch (B) and the polyvinyl alcohol (C) in the resin mixture is 5 to 70% by weight;
the modified starch (B) has an amylose content of 55% by weight or more; and the
polyvinyl alcohol (C) has a saponification degree of 85 to 99.8% by ol.

11. The molded hook surface fastener according to claim 10, wherein said modified starch (B) is the only starch present in said resin mixture.

* * * * *